United States Patent
Simard et al.

(10) Patent No.: US 10,235,453 B2
(45) Date of Patent: *Mar. 19, 2019

(54) AUTO-CLASSIFICATION SYSTEM AND METHOD WITH DYNAMIC USER FEEDBACK

(71) Applicant: Open Text Corporation, Waterloo (CA)

(72) Inventors: Charles-Olivier Simard, Montreal (CA); Alex Bowyer, Northumberland (GB); Daniel Leclerc, Montreal (CA); Steve Molloy, Chambly (CA)

(73) Assignee: Open Text Corporation, Waterloo (CA)

( * ) Notice: Subject to any disclaimer, the term of this patent is extended or adjusted under 35 U.S.C. 154(b) by 233 days.

This patent is subject to a terminal disclaimer.

(21) Appl. No.: 15/148,717

(22) Filed: May 6, 2016

(65) Prior Publication Data
US 2016/0253412 A1 Sep. 1, 2016

Related U.S. Application Data (63) Continuation of application No. 13/665,607, filed on Oct. 31, 2012, now Pat. No. 9,348,899.

(51) Int. Cl.
*G06F 17/30* (2006.01)
*G06N 99/00* (2019.01)
(Continued)

(52) U.S. Cl.
CPC ...... *G06F 17/30705* (2013.01); *G06F 3/0482* (2013.01); *G06F 3/04842* (2013.01);
(Continued)

(58) Field of Classification Search
CPC .......... G06F 17/30705; G06F 3/04842; G06F 17/30011; G06F 17/30569; G06F 17/30598; G06N 99/005
See application file for complete search history.

(56) References Cited

U.S. PATENT DOCUMENTS 6,137,911 A 10/2000 Zhilyaev
6,212,532 B1* 4/2001 Johnson .............. G06F 17/3071
707/999.003

(Continued)

FOREIGN PATENT DOCUMENTS

CA 2794103 4/2014

OTHER PUBLICATIONS

Office Action for U.S. Appl. No. 13/665,607, dated Jan. 27, 2014, 42 pgs.

(Continued)

*Primary Examiner* — Robert W Beausoliel, Jr.
*Assistant Examiner* — Hau Hoang
(74) *Attorney, Agent, or Firm* — Sprinkle IP Group (57) ABSTRACT

An auto-classification system and method provides dynamic user feedback in a guide that is presented to the user. The feedback presented in the guide enables the user to refine the classification model by adding or removing exemplars, creating, editing or deleting rules, or performing other such adjustments to the classification model. This technology enhances the overall transparency and defensibility of the auto-classification process.

21 Claims, 6 Drawing Sheets

(51) Int. Cl.
*G06F 3/0482* (2013.01)
*G06F 3/0484* (2013.01)

(52) U.S. Cl.
CPC .. *G06F 17/30011* (2013.01); *G06F 17/30569* (2013.01); *G06F 17/30598* (2013.01); *G06N 99/005* (2013.01)

(56) References Cited

U.S. PATENT DOCUMENTS

| | | | |
|---|---|---|---|
| 6,243,723 | B1 | 6/2001 | Ikeda et al. |
| 6,397,205 | B1 | 5/2002 | Juola |
| 6,519,580 | B1 | 2/2003 | Johnson et al. |
| 6,553,365 | B1 | 4/2003 | Summerlin et al. |
| 6,592,627 | B1 | 7/2003 | Agrawal et al. |
| 6,668,256 | B1 | 12/2003 | Lynch |
| 6,718,333 | B1 | 4/2004 | Matsuda |
| 6,789,069 | B1 | 9/2004 | Barnhill et al. |
| 6,792,415 | B2 | 9/2004 | Shih et al. |
| 6,868,411 | B2 | 3/2005 | Shanahan |
| 7,000,178 | B2 | 2/2006 | Unchida et al. |
| 7,028,250 | B2 | 4/2006 | Ukrainczyk et al. |
| 7,065,514 | B2 | 6/2006 | Yang-Stephens et al. |
| 7,139,695 | B2 | 11/2006 | Castellanos |
| 7,185,008 | B2 | 2/2007 | Kawatani |
| 7,194,471 | B1 | 3/2007 | Nagatsuka et al. |
| 7,275,052 | B2 | 9/2007 | Peh |
| 7,283,998 | B2 | 10/2007 | Moon et al. |
| 7,376,635 | B1 | 5/2008 | Porcari et al. |
| 7,496,567 | B1 | 2/2009 | Steichen |
| 7,499,591 | B2 | 3/2009 | Simske et al. |
| 7,574,409 | B2 | 8/2009 | Patinkin |
| 7,711,747 | B2 | 5/2010 | Renders et al. |
| 7,734,554 | B2 | 6/2010 | Simske et al. |
| 7,899,816 | B2 | 3/2011 | Kolo et al. |
| 7,899,871 | B1 | 3/2011 | Kumar et al. |
| 7,933,859 | B1 | 4/2011 | Puzicha et al. |
| 8,311,960 | B1 | 11/2012 | Ginzburg et al. |
| 8,787,681 | B1 | 7/2014 | Rubio |
| 9,256,836 | B2 | 2/2016 | Ludlow et al. |
| 9,348,899 | B2 | 5/2016 | Ludlow et al. |
| 9,760,634 | B1 * | 9/2017 | Joshi ................ G06F 17/30864 |
| 2004/0083224 | A1 | 4/2004 | Yoshida |
| 2005/0021357 | A1 | 1/2005 | Schuetze et al. |
| 2006/0248054 | A1 * | 11/2006 | Kirshenbaum ... G06F 17/30705 |
| 2007/0067258 | A1 | 3/2007 | Theilmann |
| 2008/0075352 | A1 | 3/2008 | Shibuya et al. |
| 2009/0089305 | A1 | 4/2009 | Summerlin et al. |
| 2010/0262571 | A1 | 10/2010 | Schmidtler et al. |
| 2011/0040837 | A1 | 2/2011 | Eden et al. |
| 2012/0054658 | A1 | 3/2012 | Chuat et al. |
| 2012/0150773 | A1 | 6/2012 | Dicorpo et al. |
| 2016/0117608 | A1 | 4/2016 | Ludlow et al. |

OTHER PUBLICATIONS

Chu et al. "Foundations and Advances in Data Mining, Section Web Page Classification," Springer Mar. 2005, ISBN-3-540-25057-3, 64 pgs.
Office Action for U.S. Appl. No. 13/665,607, dated Apr. 29, 2014, 49 pages.
Office Action for U.S. Appl. No. 13/665,622, dated Jul. 23, 2014, 13 pgs.
Cetintemel et al. "Self-Adaptive User Profiles for Large-Scale Data Delivery," 2000, 12 pgs.
Chen et al. "An Information Retrieval System Based on a User Profile," The Journal of Systems and Software 54, 2000, pp. 3-8.
Siersdorfer et al. "Automated Retraining Methods for Document Classification and their Parameter Tuning," 2005, pp. 478-486.
Zhang et al. "Exploration and Exploitation in Adaptive Filtering Based on Baesian Active Learning," Proceedings of the Twentieth International on Machine Learning (ICML-2003), 8 pages.
Chen et al. "PVA: A Self-Adaptive Personal View Agent," Journal of Intelligent Information Systems, (2002) pp. 173-194.
Office Action for U.S. Appl. No. 13/665,607, dated Aug. 6, 2014, 46 pages.
Office Action for U.S. Appl. No. 13/665,622, dated Nov. 3, 2014, 17 pgs.
Office Action for U.S. Appl. No. 13/665,607, dated Nov. 26, 2014, 59 pgs.
Office Action for U.S. Appl. No. 13/665,607, dated Mar. 19, 2015, 53 pgs.
Office Action for U.S. Appl. No. 13/665,607, dated Aug. 19, 2015, 61 pgs.
Office Action issued for U.S. Appl. No. 14/987,234, dated Oct. 22, 2018, 10 pgs.

* cited by examiner

AUTO-CLASSIFICATION SYSTEM AND METHOD WITH DYNAMIC USER FEEDBACK

CROSS-REFERENCE TO RELATED APPLICATION(S)

This application is a continuation of, and claims a benefit of priority under 35 U.S.C. 120 of the filing date of U.S. patent application Ser. No. 13/665,607, filed Oct. 31, 2012, issued as U.S. Pat. No. 9,348,899, which is fully incorporated herein by reference for all purposes. This application relates to U.S. patent application Ser. No. 13/665,622, filed Oct. 31, 2012, issued as U.S. Pat. No. 9,256,836, entitled "RECONFIGURABLE MODEL FOR AUTO-CLASSIFICATION SYSTEM AND METHOD," which is fully incorporated herein by reference for all purposes.

TECHNICAL FIELD

The present technology relates generally to computer systems and information technology and, in particular, auto-classification of electronic documents or digital content.

BACKGROUND

In the information age, storage and management of electronic documents (digital content) is an increasingly challenging problem.

Classification of electronic documents was originally a manual task—the function of classifying an electronic document to determine whether and for how long to archive the document was performed by the document's author or by some other records manager or archivist.

For records managers and others responsible for building and enforcing document classification policies, retention schedules, and other aspects of a records management program, the problem with traditional manual classification methods is that content needs to be understood to determine why and for how long it must be retained. Managing the retention and destruction of information reduces litigation risk, reduces e-discovery and digital archiving costs, and ensures compliance with any regulatory standards.

Many users view the process of sorting records from transient content as time-consuming and sometimes even exasperating. In addition, the ubiquity of mobile devices and social media applications makes it difficult to build standard classification tools into end-user applications.

Furthermore, records managers also struggle with enforcing policies that rely on manual, human-based approaches. Accuracy and consistency in applying classification is often inadequate when left to users, the costs in terms of productivity loss are high, and these issues, in turn, result in increased business and legal risk as well as the potential for the entire records management program to quickly become unsustainable in terms of its ability to scale.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

SUMMARY

The inventive subject matter described herein provides methods, systems, and computer-readable media for auto-classifying digital content by providing dynamic user feedback that enables the user to adjust a classification algorithm to achieve more optimal classification results.

One aspect of the inventive subject matter includes a computer-implemented method of automatically classifying digital content, the method comprising creating a classification model based on one or more selected documents that have been identified as exemplars, displaying metrics for a plurality of other documents that have been classified using the classification model, and displaying a user feedback guide that presents recommended actions to refine the classification model.

Another aspect of the inventive subject matter includes a computer-readable medium comprising programmed instructions in code which, when loaded into a memory and executed by a processor of a computing device, causes the computing device to create a classification model based on one or more selected documents that have been identified as exemplars, display metrics for a plurality of other documents that have been classified using the classification model, and display a user feedback guide that presents recommended actions to refine the classification model.

Yet a further aspect of the inventive subject matter includes an auto-classification system (or automatic document classification system) comprising a processor coupled to a memory for creating a classification model based on one or more selected documents that have been identified as exemplars and a display for displaying metrics for a plurality of other documents that have been classified using the classification model and for displaying a user feedback guide that presents recommended actions to refine the classification model.

A further aspect of the inventive subject matter includes a computer-implemented method of automatically classifying content that entails generating a classification model based on one or more selected documents that have been identified as exemplars, classifying a plurality of other documents using the classification model, displaying metrics for the plurality of other documents that have been classified using the classification model, determining recommended actions based on the metrics to improve the classification model, and displaying a user feedback guide that presents the recommended actions for improving the classification model.

A further aspect of the inventive subject matter includes a computer-implemented method of automatically classifying content that entails receiving user input that designates one or more documents as exemplars, receiving user input to cause a classification model to be generated based on the exemplars, receiving user input to cause a plurality of other documents to be classified using the classification model, displaying metrics indicative of a precision of the classification model for the plurality of other documents that have been classified using the classification model, and displaying a user feedback guide that presents recommended actions to improve the precision of the classification model.

The details and particulars of these aspects of the inventive subject matter will now be described below, by way of example, with reference to the attached drawings.

DETAILED DESCRIPTION

Embodiments of the inventive subject matter, which are described below, enable various techniques and approaches pertaining to the auto-classification of digital content or electronic documents.

By way of overview, and to place the novel technology in its proper context, the novel technology should be understood as being part of one or more processes of auto-classifying digital content. The improved technology provides dynamic user feedback in the form of an onscreen guide or recommended actions that enables the user to refine an auto-classification model.

As will elaborated below, the inventive subject matter in general provides a computer-implemented method of automatically classifying digital content that comprises creating a classification model based on one or more selected documents that have been identified as exemplars, displaying metrics for a plurality of other documents that have been classified using the classification model, and displaying a user feedback guide that presents recommended actions to refine the classification model. Also disclosed herein is a computer-readable medium for performing this method as well as an auto-classification system for classifying digital content that displays a user feedback guide for recommending to the user how to improve the accuracy of the model used for classification.

Figure 1:
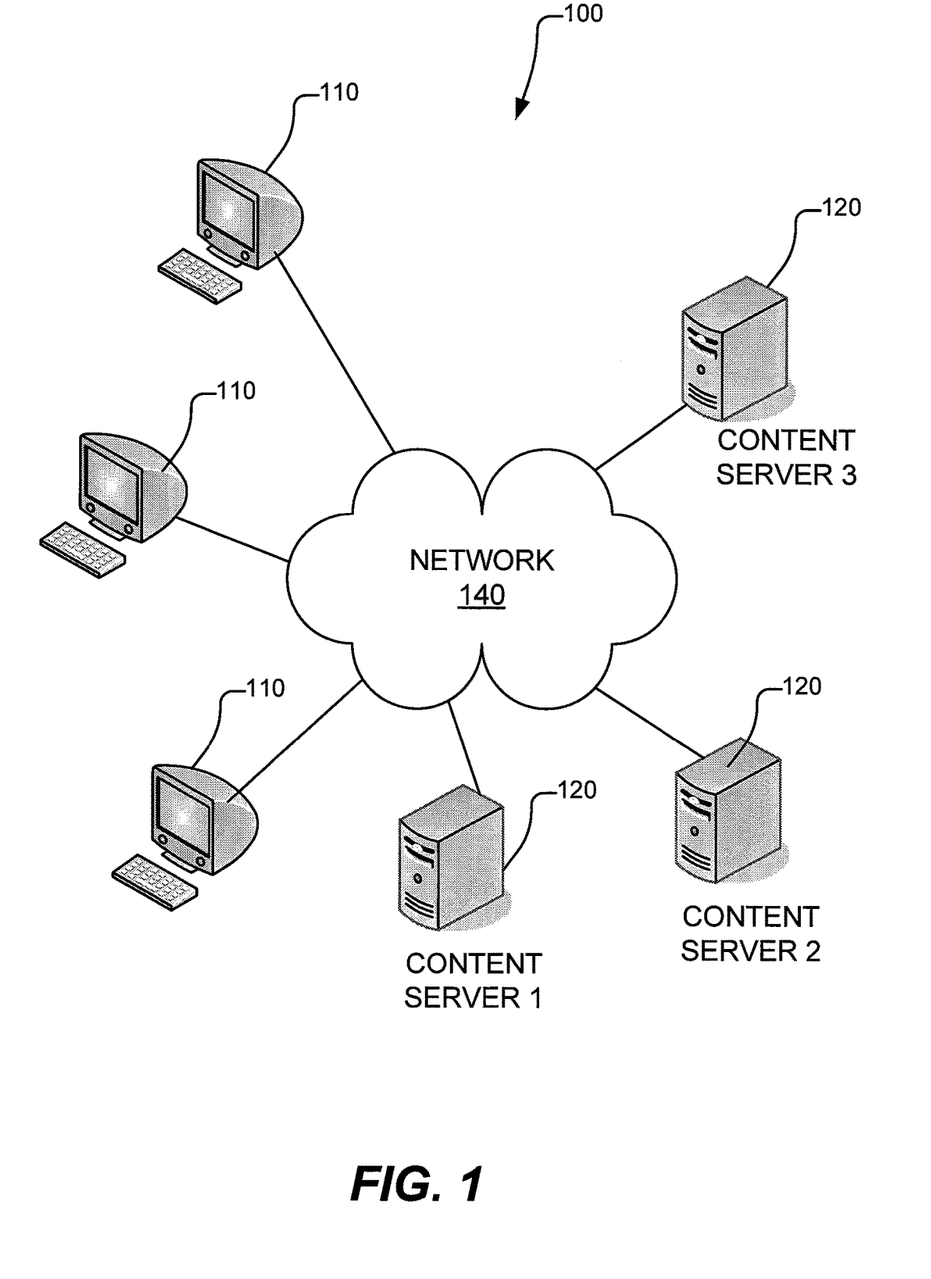
FIG. 1 is a schematic depiction of a networked computer system on which embodiments of the inventive subject matter may be implemented.

FIG. 1 schematically depicts an exemplary computer network environment 100 for implementing embodiments of the inventive subject matter. In some embodiments, a computer-based auto-classification system includes client computers 110 which communicate through a network 140 with one or more content servers 120 to obtain digital content (electronic documents) stored on the one or more content servers 120. The computer-implemented method may be performed by the client computers 110 to classify content stored on the content servers.

In other embodiments, the content to be classified may be stored in a memory of the client computer itself.

In other embodiments, the content may be stored on a removable memory device, in the cloud, or in any other location accessible by the computer 110.

In yet other embodiments, the client computers 110 may act as terminals, hypertext browser clients, graphical display clients, or other networked clients to the server 120. For example, a web browser application at the client computers 110 may support interfacing with a web server application at the server 120. Such a browser may use controls, plug-ins, or applets to support interfacing with the server 120. The client computers 110 can also use other customized programs, applications, or modules to interface with the server 120.

The client computers 110 can be desktop computers, laptops, handhelds, mobile devices, mobile telephones, television set-top boxes, kiosks, servers, terminals, thin-clients, or any other computerized devices.

The network 140 may be any data communications network capable of supporting data communications between the client computers 110 and the servers 120. The network 140 may be wired, wireless, optical, radio, packet switched, circuit switched, or any combination thereof. The network 140 may use any topology, and links of the network 140 may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, the Internet (or the World Wide Web), a LAN, WAN, MAN, or any other network for interconnecting computers. To support high volume and load, a distributed computing environment may be implemented by using networking technologies that may include, but are not limited to, TCP/IP, RPC, RMI, HHTP, Web Services (XML-RPC, JAX-RPC, SOAP, etc.).

Although the computer 110 in most embodiments obtains the documents directly from the content server 120, in another embodiment the system may optionally include an ingestion broker between the content server and the computer that ingests, parses, processes, normalizes and/or stores documents for building models, testing the models and for running classification jobs. The ingestion broker supports extraction of textual content from static or binary files (like PDF and Microsoft Office documents) in the ingestion queue, and also supports chaining of transformers and processors. Optionally, during the ingestion process, the system can also call a content analytics module or text annotator in order to enrich documents with semantic annotations before they are imported for classification.

Figure 2:
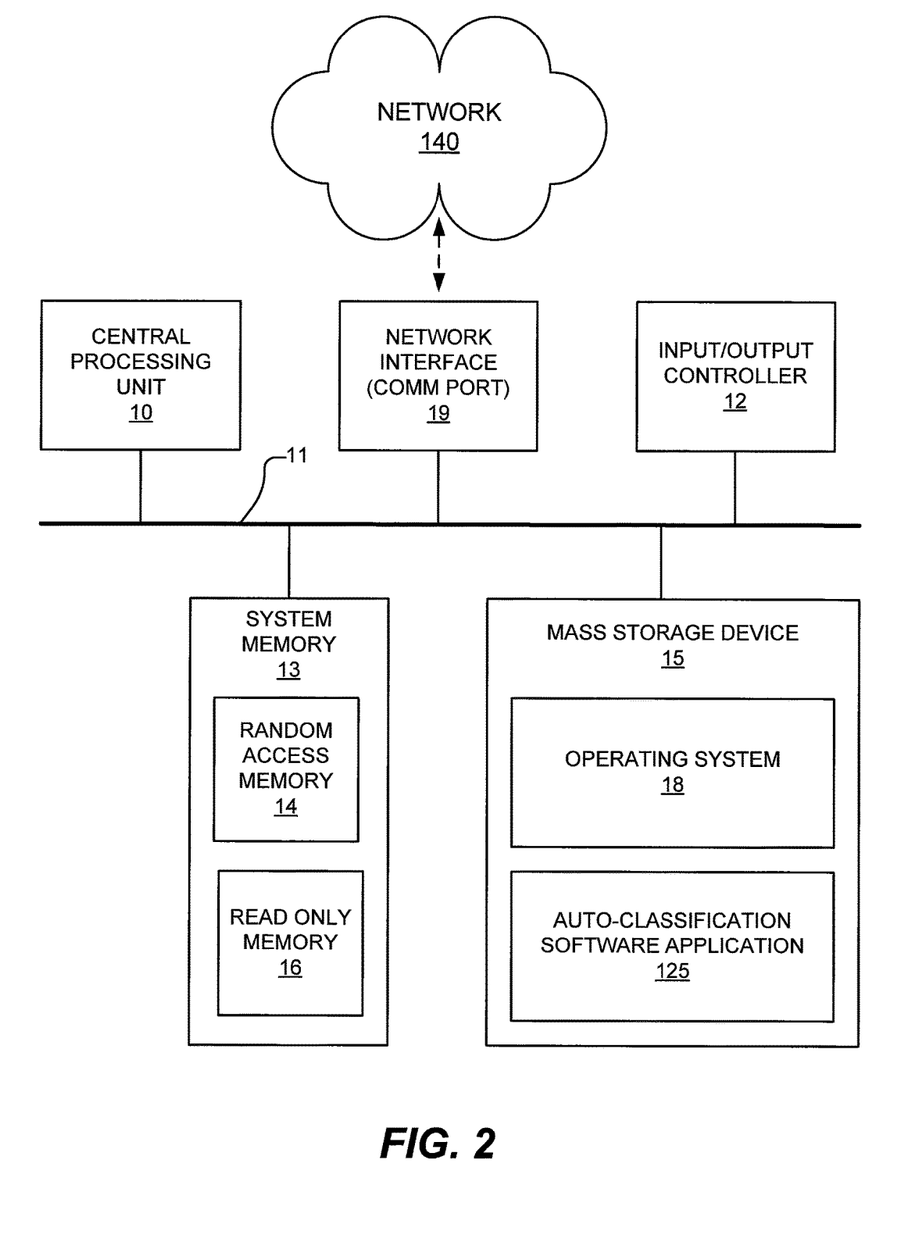
FIG. 2 is a schematic depiction of a computing device for implementing embodiments of the inventive subject matter.

Turning now to FIG. 2, an exemplary computer (also referred to herein as a computing device) can execute software components and modules for auto-classifying digital content. The computer architecture shown in FIG. 2 illustrates a conventional desktop, laptop, or server and may be utilized to execute aspects of the software components presented herein. It should be appreciated, however, that the described software components can also be executed on other computing devices such as mobile devices, handheld wireless communications devices, smart phones, tablets, set-top boxes, kiosks, etc.

The computer illustrated in FIG. 2 can include a central processing unit 10 (CPU), also referred to herein as a processor or microprocessor, a system memory 13, including a random access memory 14 (RAM) and a read-only memory 16 (ROM), and a system bus 11 that can couple the system memory 13 to the CPU 10. A basic input/output system (BIOS) containing the basic routines that help to transfer information between elements within the computer, such as during start-up, can be stored in the ROM 16. The computer may further include a mass storage device 15 for storing an operating system 18, software, data, and various program modules. The auto-classification software 125 may be stored in the mass storage device 15.

The mass storage device 15 can be connected to the CPU 10 through a mass storage controller which is connected to the bus 11. The mass storage device 15 and its associated computer-readable media can provide non-volatile storage for the computer. Although the description of computer-readable media contained herein refers to a mass storage device, such as a hard disk, solid-state drive or CD-ROM drive, it should be appreciated by those skilled in the art that computer-readable media can be any available computer storage media that can be accessed by the computer.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the inventive subject matter, the computer may operate in a networked environment using logical connections to remote computers through the network 140 (e.g., the Internet). The computer may connect to the network 140 through a network interface 19 which may be a communications port such as a DSL or cable modem, Ethernet connection, or any suitable wired or wireless switch or router, etc. The network interface 19 is connected to the bus 11. It should be appreciated that the network interface unit 19 may also be utilized to connect to other types of networks and remote computer systems. The computer may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

A number of program modules and data files may be stored in the mass storage device 15 and RAM 14 of the computer, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the auto-classification software application 125 for execution by the CPU 10. The auto-classification application 125 can include software components for implementing portions of the processes disclosed herein. The mass storage device 15, the ROM 16, and the RAM 14 may also store other types of program modules for accessing the documents on the content server.

Figure 3:
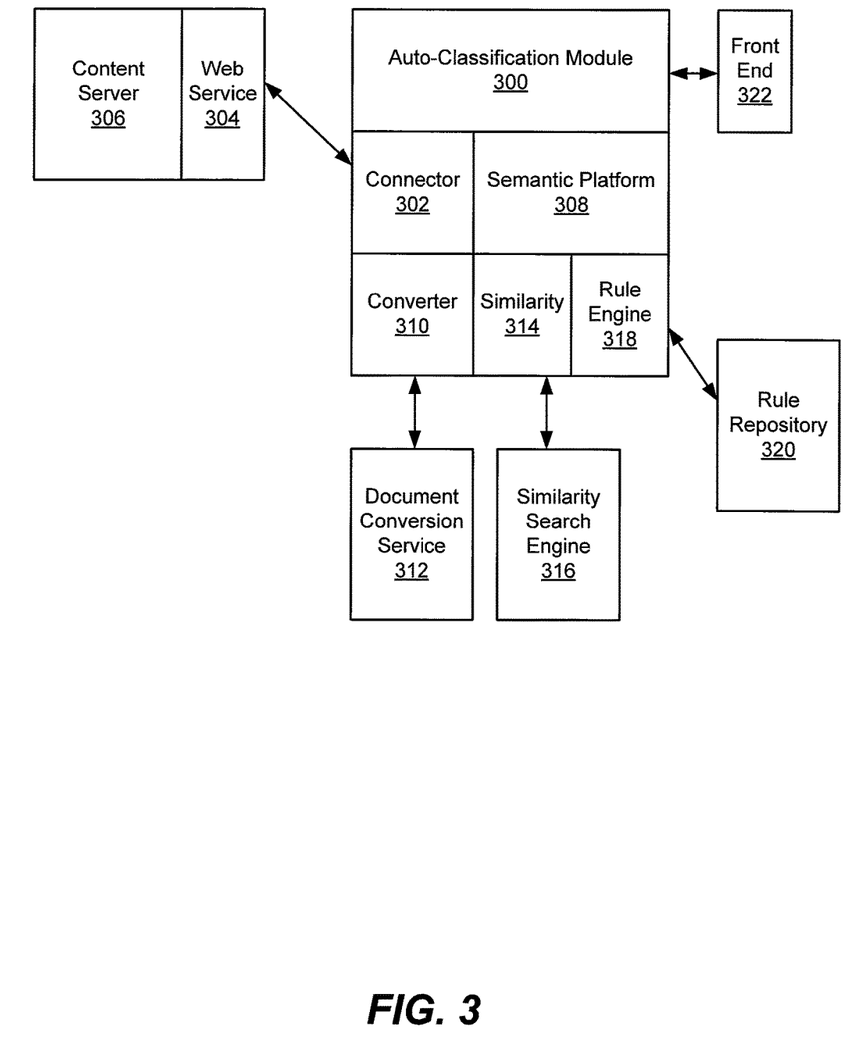
FIG. 3 is a schematic depiction of the architecture of the auto-classification system in accordance with one embodiment of the inventive subject matter.

Referring now to FIG. 3, a block diagram illustrates various exemplary components of one example architecture of an auto-classification system according to some embodiments of the inventive subject matter. As illustrated, the system includes an auto-classifier module 300 or engine that implements one or more algorithms for creating models, providing metrics, suggesting recommended actions and classifying documents based on a model. The system includes a connector 302 for communicating with a web service 304 of a content server 306. The system includes a semantic platform 308 for performing semantic analysis on the content for semantic-based classification. The system includes a converter 310 which communicates with a document conversion 312 service, a similar documents search module 314 that communicates with a similarity search engine 316 and a rule engine 318 that liaises with a rule repository 320. The auto-classification module may also have a front end 322 to provide one or more user interfaces. It should be understood that this architecture is presented solely by way of example and that other embodiments of this auto-classifier may have a different architecture.

Figure 4:
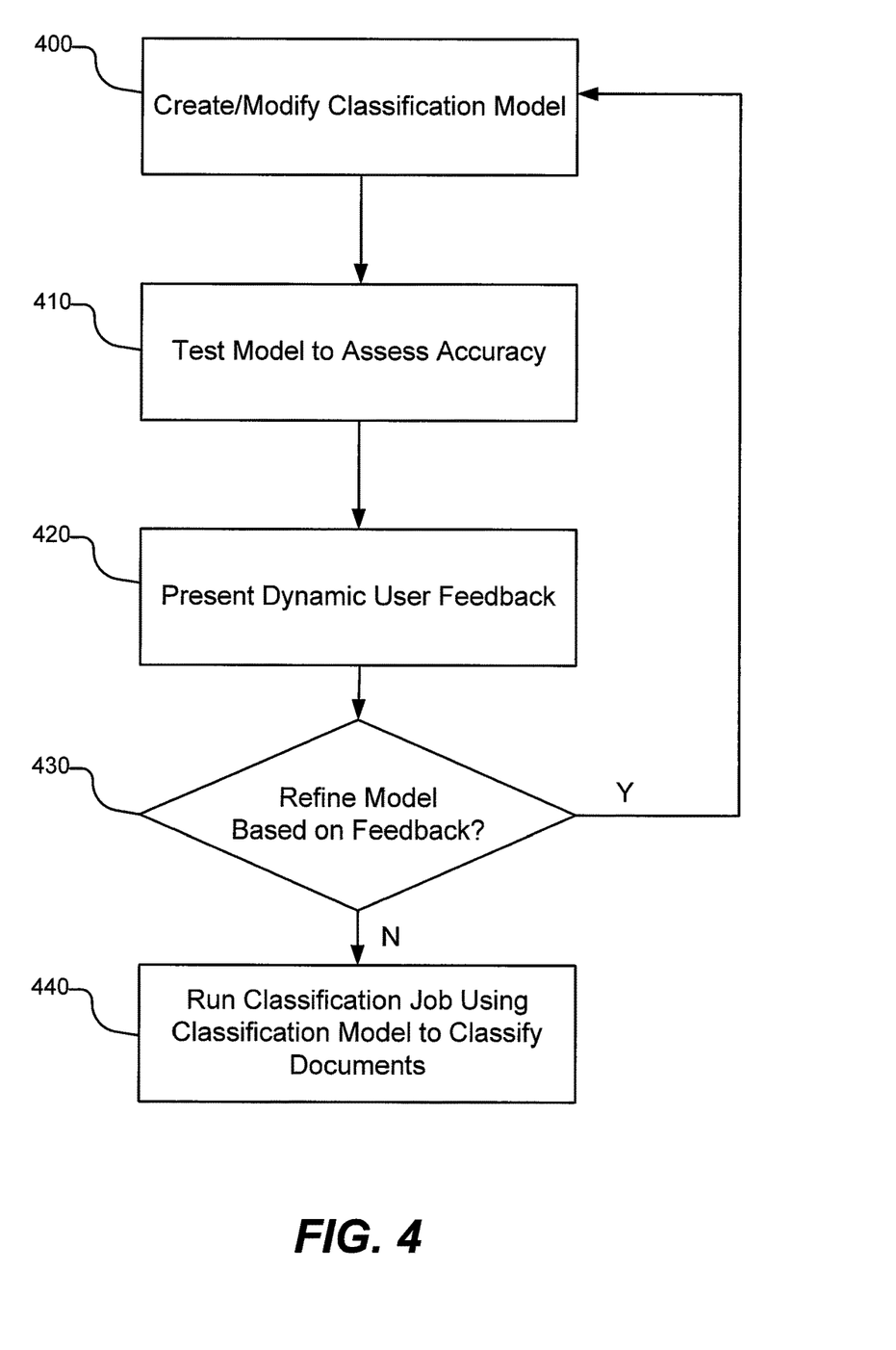
FIG. 4 is a flowchart depicting steps of a method of automatically classifying content in accordance with some embodiments of the inventive subject matter.

FIG. 4 is a flowchart depicting the general method of auto-classification. As depicted in FIG. 4, the method in general entails an initial step 400 of creating a classification model. Alternatively, where an existing model has already been created, step 400 may entail modifying an existing model. The method then involves testing (at step 410) the model to assess its accuracy. The method further involves presenting dynamic user feedback at step 420 based on the testing. The method then determines (at step 430) whether the user wishes to refine the model in view of the metrics or other information provided as feedback to the user. If yes, operations cycle back to step 400 whereby the model may be modified by the user, as will be explained in greater detail below. If no, then the method entails running a classification job to classify documents according to the model (at step 440).

As will be explained below, the model may be built by importing exemplars (which are example documents whose content is meant to exemplify a category of content) and by defining rules. In some embodiments, after running a test classification on a small sample of documents using the model, and after the user has performed a manual review of a collection of the documents, the metrics are computed and presented on the user interface to inform the user as to the accuracy of the model. The system then displays recommended actions to enable the user to improve the model's accuracy. The recommended actions may be presented as part of a guide that provides user feedback on the model's classification performance. This guide may be understood as providing dynamic user feedback in the sense that the user can iteratively tweak the model and keep re-running the classifications to see how each change to the model improves the model's accuracy. Each time the user re-runs the classification, the guide will update the recommended actions to provide updated feedback to the user based on the latest iteration of the model.

Figure 5:
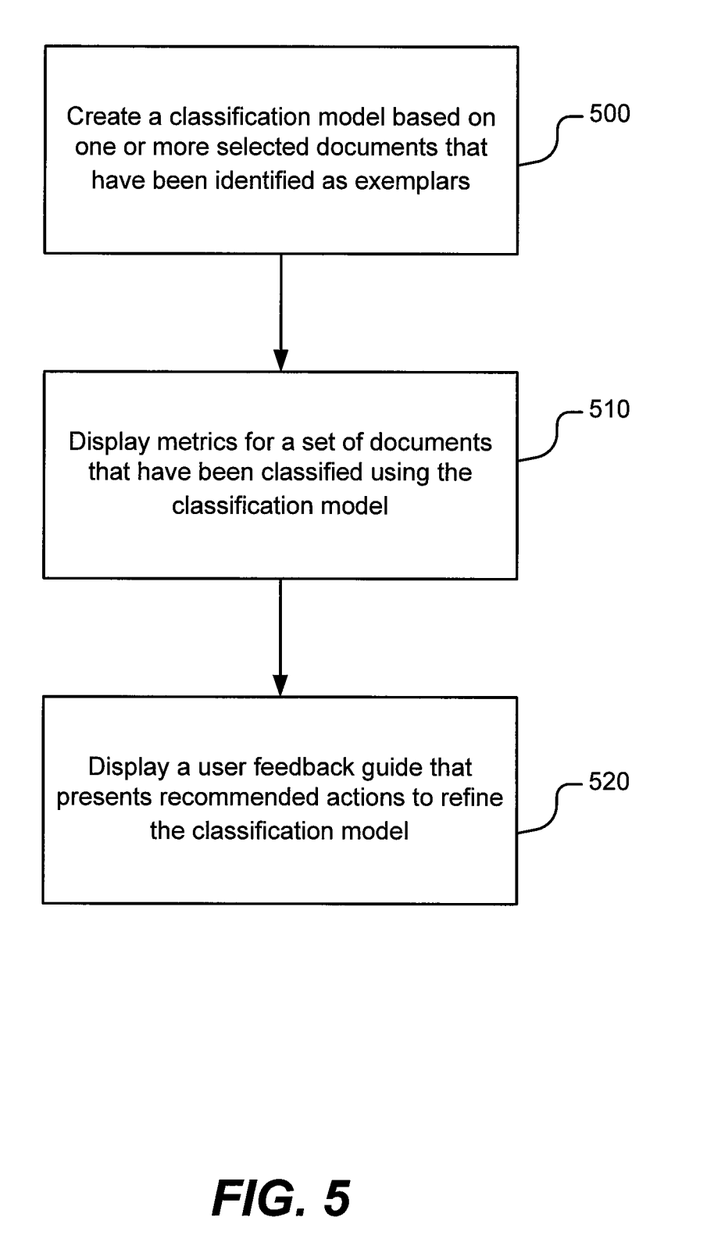
FIG. 5 is a further flowchart depicting steps of providing dynamic user feedback to enable the user to refine the auto-classification model.

Now turning to FIG. 5, this method is summarized in general terms in the flowchart. The method entails a step 500 of creating a classification model based on one or more selected documents that have been identified as exemplars. The method involves a subsequent step 510 of displaying metrics for a set of documents that have been classified using the classification model. The method further entails a step 520 of displaying a user feedback guide that presents recommended actions to refine the classification model. The recommended actions (which take the form of recommendations, suggestions, tips, etc.) may be specific to one of the metrics or applicable to two or more metrics. In one embodiment, the user guide that presents the recommendations may be user-configurable (and/or responsive to user input) to provide recommendations related only to one metric or to a selected subset of metrics.

The recommended actions may be determined by a recommendation-generating module/component (or engine, algorithm, artificial intelligence, heuristic, etc.) that determines one or more recommendations based on the metrics. Thus, the method of FIG. 5 may further involve a step (which is not depicted in the flowchart) of determining or generating a recommendation by performing an analysis or computation based on one or more of the metrics.

Various embodiments, aspects and embodiments of this technology will now be explained in greater detail below.

Metrics

The auto-classification system (auto-classifier) is configured to provide feedback to the user in the form of metrics or other information that the user can review to determine whether the model is sufficiently accurate and for optionally adjusting the classification model to improve its accuracy.

Metrics, which in some embodiments includes statistics including, but not limited to, correlations, deviations, means, medians, variances, etc., may be displayed by the auto-classification system on a user interface (screen) after running a classification on a set of documents. These metrics help the user determine what changes should be made before classifying documents, for instance, before running an actual classification job. In one embodiment of this technology, the system provides one or more of the following metrics:

Match—a "match" is a document that has an assigned classification that is the same as the expected classification, which means that the auto-classification system has assigned the correct classification to the document.

Noise—"noise" represents the documents where a currently viewed classification was assigned, but a different classification was expected.

Silence—"silence" represents the documents where a currently viewed classification was expected, but a different classification, or no classification, was assigned.

Unclassified—"unclassified" which may be a subset of silence and represents the documents without an assigned classification.

Precision—"precision" is a property of the model, rather than a set of documents. Expressed in most embodiments as a percentage, it represents the proportion of assigned classifications that match the expected classifications. Precision is calculated using both the noise and match metrics, and is a very important measure of model accuracy. The results indicate the proportion of classified documents that will be correctly classified. The less noise a model has, the more precise the model is, which results in a higher accuracy level.

Recall—"recall" is a property of a model and represents the frequency with which the expected classification is assigned across all processed documents, not just those that had a classification. Recall is calculated using silence versus the number of matches. The results indicate the proportion of all documents that will be correctly classified when a classification job is run. Less silence results in a better recall number.

While it is useful to present all of these metrics, in other embodiments, the system may provide only a subset of these metrics. There may also be additional metrics (not mentioned above) in yet further embodiments of the system. Which metrics are presented and how these metrics are presented may be user-configurable.

In one embodiment, the system will report a confidence level. The confidence level refers to the auto-classification system's level of certainty that it has assigned the correct classification to a document. It is determined by comparing a document to a set of exemplars, adding the classifications for the exemplars, and calculating a confidence score based on the information.

In one specific embodiment, the confidence level may be assigned based on a plurality of predefined levels, for example five predefined levels, as shown by way of example in the following list: Unclassified [Level 1]; Poor [Level 2]; Fair [Level 3]; Good [Level 4]; and Very Good [Level 5]. In this particular example, when a document receives a confidence level of only "1", it means that the auto-classification system processed the document, but could not determine which classification to assign. Documents with a confidence level of "1" are thus unclassified. A confidence level scoring of 1-5 is clearly only intended as one example of how confidence level scoring may be implemented.

At low confidence levels, the assigned classification has a low probability of being correct. However, some documents with low confidence levels could still be accurately classified. High confidence levels mean the assigned classification has a high probability of being correct. However, some documents could still be inaccurately classified. Reviewing the documents with the highest and lowest confidence levels can help the user locate auto-classification system errors. In some cases, these classifications could have ambiguous exemplars or rules. The guide may optionally indicate this to the user.

Creating and Managing Models

A model is notionally a container that holds a set of classified documents that are used as examples (referred to herein as "exemplars") to train the model.

To begin the process of creating a model, on the auto-classification dashboard (or other user interface), the user selects a user interface element (e.g., clicks on "create a model"). In one embodiment, a model creation assistant wizard is launched to guide the user through the model creation process. In one embodiment, this wizard prompts the user to type a name and description for the model. To create the model, the user adds documents and exemplars from the content server (or other document source). The user may also optionally create rules. Thus, the model requires at least one exemplar although better results are achieved by using a plurality of exemplars. Rules may be added to dictate certain classifications, as will be explained below. In most embodiments, the system enables the models to be deleted, viewed and edited.

The model creation process may also request that the user select the classifications that are to be imported into the model. The model creation process may also request that the user choose whether to allow sampling to automatically select test documents. When the sampling option is enabled, the auto-classification system automatically selects a set of exemplars to use as test documents. These test documents are chosen randomly from the documents that are imported into the model at the time it is created. If the user does not want test documents to be automatically chosen, the user can select the test documents. In one embodiment, when the model creation begins, a status window opens to show the status of the options that have been selected.

Each document identified as an exemplar and that is added to a model as such represents the classification to which it is assigned. The auto-classification system uses the exemplars as a basis for recognizing similar content and attributes for subsequently classifying other documents. When the user selects documents (in a content server or elsewhere) that are to be automatically classified, the auto-classification system compares the documents to the exemplars and automatically assigns the appropriate classification if the characteristics are a close enough match.

After a model is created, the system permits the user to add more exemplars. This may, for example, be done in response to the guide presenting a recommended action to the user to add more exemplars. In one specific embodiment, the user interface of the auto-classification system may provide an Add Document button (or it may provide any other equivalent user interface element for this functionality). In this particular embodiment, an Add Documents Assistant may be displayed to guide the user through the process of adding a document as an additional exemplar. In this embodiment, the Add Document Assistant may include the following functions:

(i) Select Classification(s), which displays a list of available classification trees in the content server. This enables the user to select individual classifications or to select an entire classification tree, and to import all of the documents with that classification assigned. The auto-classification system can be configured to retrieve documents with the specified classification from every location in the content server. Content may also be imported into the auto-classification system from any other content source or repository, e.g., content management systems (CMS), file systems, etc.

(ii) Sampling Settings, which, when enabled, allow the system to select a random set of documents from the set of documents being imported, and convert them to test documents. Test documents are used to test the model's accuracy before creating an actual classification job. If the user does not want test documents automatically selected, this sampling feature may be disabled when adding exemplars.

(iii) Classification Settings, which allows the user to run a classification test on the model once documents are added.

(iv) Summary, which provides a short summary of the options selected.

In one embodiment, the system enables exemplars to be converted into test documents.

In another embodiment, the system enables exemplars to be deleted or removed for a classification. Because a classification must always contain at least one exemplar, any command to delete the last remaining exemplar for a classification may cause the system to display a warning message stating that the classification will be removed along with the selected exemplar(s). Likewise, because a model requires at least one exemplar, the system may display a warning in response to a command to delete the last exemplar from a model.

Rules

Creating the classification model may optionally comprise defining at least one classification rule. Each rule comprises a rule priority determining an order in which rule is applied, a confidence level to be applied to a document when the document satisfies a condition specified by the rule and an applied classification that is to be applied to the document.

In addition to using exemplars, the system enables the user to add one or more rules to a model to help the auto-classification system accurately assign classifications to documents. In one embodiment, the system requires that there be at least one classification with at least one exemplar before a rule may be added, although in other embodiments this is not necessarily so.

In one embodiment, a rule may be created by specifying: a rule name and a rule priority. The priority may be expressed as a number, e.g., the lower the number, the lower the priority. For example, given two rules with priorities of 99 and 50, the rule with the priority of 99 will run first, followed by the rule with a priority of 50. The rule may also specify a confidence level, which may, for example, range from Level 2 to Level 5 to represent the level of certainty that the user wants to apply to the document when the rule finds a matching document. In other words, the confidence level of a rule is based on the level of certainty the rule creator has that the conditions of the rule will match only documents that should receive the classification. The rule may also stipulate an applied classification, which is the classification the user wish to apply to a document when the specified conditions are met. The list is populated with the names of all classifications represented in the model.

Once the user has specified the parameters for the rule, the user can enter conditions that must be met for the rule to assign the selected classification to a document. The following parameters can be defined:

(i) Field Name, which allows the user to specify the part of the document that the user expects the text/information, as defined in the Value parameter below, to appear.

(ii) Operator, which allows the user to specify whether the Field Name parameter equals or does not equal, matches, or contains the text/information, as defined by the Value parameter below.

(iii) Value, which allows the user to enter text or other characters that the user wants found in the part of the document defined by the Field Name parameter.

In some embodiments, the system enables rules to be not only created but also viewed, changed (edited), and deleted.

Testing a Model for Accuracy

When a model has been created and contains exemplars, tools provided by the auto-classification system enable a user to run tests on the model to assess its accuracy. A test run may be performed on a small training corpus of documents that the user selects for this purpose. Based on a review collection, the system displays classification metrics on a metric panel from this test run to provide the user with feedback on the accuracy of the model. The metrics displayed in the metrics panel enable the user to optimize a model's accuracy.

The review collection is a set of non-classified documents from a content server on which a classification test is run. A review collection enables the user to compare the accuracy of a classification assigned by the auto-classification system (by applying the model) with the classification that the user would assign manually. Assigned classifications may be accepted or rejected. The user may specify an expected classification for each document that has been misclassified. Based on the manual review, the system will know which documents have been correctly classified and which documents have not.

Figure 6:
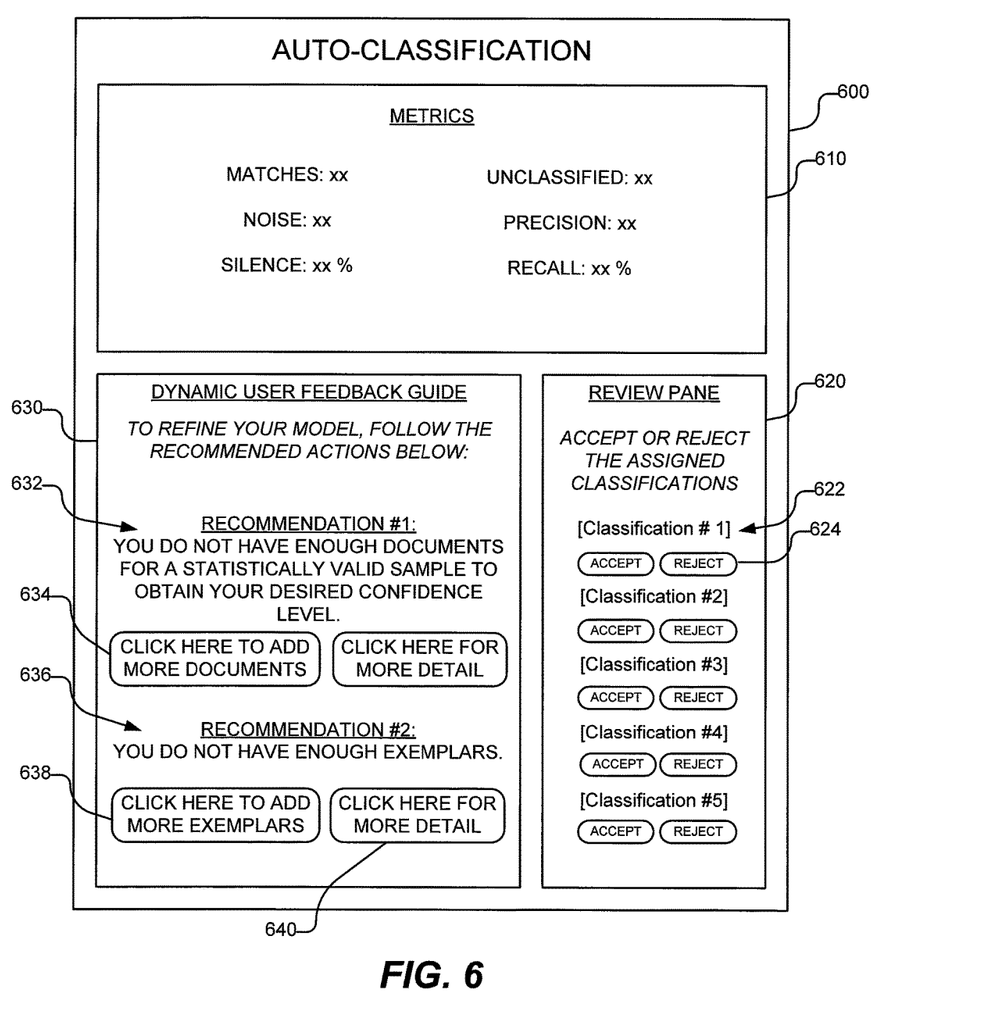
FIG. 6 is a schematic depiction of an auto-classification user interface that can present dynamic user feedback in the form of an onscreen guide in accordance with an embodiment of the inventive subject matter.

As depicted by way of example in FIG. 6, the system may present dynamic user feedback in the form of a guide presenting recommended actions (or recommendations, suggestions or tips) for optimizing the accuracy of the model. This guide may be displayed on the user interface in the form of a panel, window, dialog box, etc. In some embodiments, the guide is selectively displayed based on the metrics, e.g., based on the accuracy. In most embodiments, the guide is displayed even if the accuracy is extremely high. Optionally, in other embodiments, the dynamic user feedback guide may be activated and displayed only when the accuracy falls below a predetermined threshold. For example, if the recall and/or precision values are below a predetermined threshold, the guide may be activated and displayed onscreen. The guide may comprise user interface elements (e.g., remedial action buttons that may be clicked or touched to display more details, help information, or to bring the user to the proper menu or tab, or to launch a function that performs or at least initiates the remedial action). In one embodiment, the guide may include any visual or audible alerts.

In some embodiments, the dynamic user feedback guide may be automatically activated and displayed on the computing device without user intervention or user input (other than running the classification test). In other embodiments, the dynamic user feedback guide is only activated and displayed in response to user input on a user-selectable interface element.

FIG. 6 illustrates one example of an auto-classification user interface that includes a dynamic user feedback guide in accordance with embodiments of the inventive subject matter. The auto-classification UI 600 is displayed on a display screen of a computing device. The UI may present or display a metrics summary 610 for the classification test. The metrics summary may present metrics that include, for example, matches, noise, silence, unclassified, precision and recall. A subset of these may be displayed in a variant. Similarly, the metrics summary may include other metrics not illustrated in this example.

As further depicted by way of example in FIG. 6, the UI 600 may include a review pane 620. The review pane presents classifications 622 which are denoted generically in this example as classification #1, classification #2, etc. Associated with each classification is a user-selectable interface element 624 that is responsive to user input to enable the user to accept or reject each classification. These may be in the form of buttons as shown by way of example in FIG. 6 or any other suitable interface element(s) may be employed.

As further depicted in FIG. 6, the UI 600 includes a dynamic user feedback guide 630. This guide 630 presents recommendations 632, 634 or recommended actions, suggestions, tips, or other information that guides the user in the process of refining the classification model to obtain better results. As shown in this example, a first recommendation 632 is presented along with a second recommendation 636.

As illustrated by way of example in FIG. 6, recommendation #1 suggests "YOU DO NOT HAVE ENOUGH DOCUMENTS FOR A STATISTICALLY VALID SAMPLE TO OBTAIN YOUR DESIRED CONFIDENCE LEVEL." A user interface element 634 is displayed to enable the user to remedy the deficiency by clicking on the recommended action (e.g., "CLICK HERE TO ADD MORE DOCUMENTS"). Similarly, recommendation #2 suggests "YOU DO NOT HAVE ENOUGH EXEMPLARS." A user interface element 638 presents a remedial action to the problem identified by the dynamic user feedback guide and enables the user to perform the recommended remedial action by clicking on this user interface element 638 (e.g., "CLICK HERE TO ADD MORE EXEMPLARS"). Optionally, a "MORE DETAIL" button 640 (or other suitable user interface element) may be displayed as shown by way of example in FIG. 6 to cause the dynamic user feedback guide to present more detailed information, e.g., about the various metrics and/or the underlying theory of how these metrics are determined and/or how exemplar and/or rules operate, and/or how the classification model works.

In one embodiment, the recommendations (e.g., recommendation #1 and recommendation #2) may be prioritized based on importance, for instance, the impact that the recommended action is likely to have on the overall accuracy or other performance metric. In another embodiment, the recommendations are not prioritized. In still another embodiment, multiple recommendations may be linked, indicating that two or more remedial actions should be taken in conjunction and indicating that only one of the actions alone would not suffice to ameliorate or correct the issue, problem or deficiency that has been identified.

In a further embodiment, the remedial action proposed or recommended by the dynamic user feedback guide may indicate by words, colors, symbols or graphically the expected likely effect or impact of the remedial action on the metrics. For example, the remedial actions may have a number, stars, color code, etc. indicating whether the action is expected to have a major or significant impact on the issue or whether it is likely to have a minor impact. It is also possible that the dynamic feedback guide may indicate that it is known what the impact might be (e.g., with a symbol like a question mark, words or other suitable graphics or icon).

Classifying Documents (Running a Classification Job)

After having created a model, assessed its accuracy, and having used a review collection to test the content server documents to classify, the user may then run a classification job to classify documents based on the model. Classification jobs may be run on groups of documents, entire databases, entire drives, subsets thereof or individually selected groups of documents.

When running the classification job, the auto-classification system may display metrics for the number of documents processed, the number that have been classified, the number that remain unclassified, the number that have been rejected and those assigned an uncertain status (which means the document was classified but with a low confidence level, e.g., a confidence level of 2 or 3). The auto-classification system may further display these metrics as the classifying is being performed and/or after the classification job is complete. The system may further display the metrics in various forms, such as for example graphs, charts, etc. The system may optionally further store metrics, e.g., accuracy, over time to permit the user to observe, e.g., via a graph or other such means, whether there is an improvement or degradation in the accuracy metrics.

In one alternative embodiment, the system may permit the creation of a plurality of models which can be created, utilized and refined by different users at the same time. For example, this may be done by creating different versions of the same model. This would enable different users to employ different approaches, to view their own results and to concentrate on their own aspects of the classification model.

The technology disclosed herein enables the user to receive dynamic user feedback in the form of a metrics panel as well as a guide presenting recommended actions to improve the accuracy of the model. The improved metrics, user feedback and user-configurability of this auto-classification system thus enhance the overall transparency and defensibility of the auto-classification process.

Any of the methods disclosed herein may be implemented in a particular machine including hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s). In a software embodiment, software components and modules may be implemented using standard programming languages including, but not limited to, object-oriented languages (e.g., Java, C++, C#, Smalltalk, etc.), functional languages (e.g., ML, Lisp, Scheme, etc.), procedural languages (e.g., C, Pascal, Ada, Modula, etc.), scripting languages (e.g., Perl, Ruby, Python, JavaScript, VBScript, etc.), declarative languages (e.g., SQL, Prolog, etc.), or any other suitable programming language, version, extension or combination thereof.

A computer-readable medium can be any non-transitory means that can contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a non-transitory computer-readable medium including, but not limited to, a floppy-disk, a CD-ROM, a DVD, RAM, ROM, EPROM, Flash Memory or any suitable memory card, etc. The method may also be implemented in hardware. A hardware embodiment might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This inventive subject matter has been described in terms of specific embodiments, embodiments and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method for auto-classification of digital content, the method comprising:
receiving, over a network by a server machine embodying an auto-classification system through a user interface of the auto-classification system on a user device, an indication from a user to create or modify a classification model;
responsive to the indication, generating or accessing a container for the classification model, the container configured for holding classified documents for training the classification model, the generating or accessing performed by the server machine embodying the auto-classification system;
providing, by the server machine embodying the auto-classification system, a list of classification trees to the user device over the network for display on the user device, the list of classification trees residing on a content source communicatively connected to the auto-classification system;
receiving, by the server machine embodying the auto-classification system through the user interface on the user device, a selection of a specific classification or a classification tree from the list of classification trees displayed on the user device, the classification tree comprising individual classifications;
importing one or more content source documents that have been assigned with the specific classification or the classification tree from the content source into the container for the classification model, the importing performed by the server machine embodying the auto-classification system;
determining, by the server machine embodying the auto-classification system, a plurality of documents to be automatically classified, the plurality of documents residing on the content source or a data source communicatively connected to the auto-classification system;
automatically classifying the plurality of documents residing on the content source or the data source utilizing the one or more content source documents in the container for the classification model, the automatically classifying performed by the server machine embodying the auto-classification system and comprising:
comparing characteristics of the one or more content source documents in the container for the classification model and characteristics of a document of the plurality of documents residing on the content source or the data source; and
automatically assigning the document to the specific classification or the individual classifications of the classification tree of the one or more content source documents in the container for the classification model responsive to the characteristics of the document sufficiently matching the characteristics of the one or more content source documents in the container for the classification model;
activating a dynamic user feedback guide in the user interface;
determining at least one recommended action, suggestion, tip, or piece of information for refining the classification model; and
displaying the at least one recommended action, suggestion, tip, or piece of information in the dynamic user feedback guide of the user interface on the user device.

2. The method according to claim 1, wherein the content source comprises at least one of a content server, a content repository, a content management system, or a file system.

3. The method according to claim 1, further composing:
automatically selecting a random set of documents from content source documents being imported into the container for the classification model; and
converting the random set of documents to test documents for assessing accuracy of auto-classification by the classification model.

4. The method according to claim 1, further comprising:
responsive to a command to delete or remove an exemplar from a classification in the classification model, determining whether the exemplar is last exemplar for the classification in the classification model; and
responsive to the exemplar being the last exemplar for the classification in the classification model, displaying a warning message that the classification is to be deleted or removed from the classification model along with the exemplar.

5. The method according to claim 1, wherein the user interface of the auto-classification system comprises a review function through which classifications automatically assigned by the auto-classification system to the plurality of documents residing on the content source or the data source are reviewed, accepted, rejected, or corrected.

6. The method according to claim 1, further comprising: automatically performing the activating.

7. The method according to claim 1, further comprising: performing the activating responsive to user input on a user-selectable interface element of the user interface.

8. A computer program product for auto-classification of digital content, the computer program product comprising a non-transitory computer-readable medium comprising instructions translatable by a server machine running an auto-classification system for:
receiving, over a network through a user interface of the auto-classification system on the user device, an indication from a user to create or modify a classification model;
responsive to the indication, generating or accessing a container for the classification model, the container configured for holding classified documents for training the classification model;

providing a list of classification trees to the user device over the network for display on the user device, the list of classification trees residing on a content source communicatively connected to the auto-classification system;

receiving, through the user interface on the user device, a selection of a specific classification or a classification tree from the list of classification trees displayed on the user device, the classification tree comprising individual classifications;

importing one or more content source documents that have been assigned with the specific classification or the classification tree from the content source into the container for the classification model;

determining a plurality of documents to be automatically classified, the plurality of documents residing on the content source or a data source communicatively connected to the auto-classification system;

automatically classifying the plurality of documents residing on the content source or the data source utilizing the one or more content source documents in the container for the classification model, the automatically classifying comprising:

comparing characteristics of the one or more content source documents in the container for the classification model and characteristics of a document of the plurality of documents residing on the content source or the data source; and automatically assigning the document to the specific classification or the individual classifications of the classification tree of the one or more content source documents in the container for the classification model responsive to the characteristics of the document sufficiently matching the characteristics of the one or more content source documents in the container for the classification model;

activating a dynamic user feedback guide in the user interface;

determining at least one recommended action suggestion, tip, or piece of information for refining the classification model; and displaying the at least one recommended action, suggestion, tip, or piece of information in the dynamic user feedback guide of the user interface on the user device.

9. The computer program product of claim 8, wherein the content source comprises at least one of a content server, a content repository, a content management system, or a file system.

10. The computer program product of claim 8, wherein the instructions are further translatable by the server machine running the auto-classification system for:

automatically selecting a random set of documents from content source documents being imported into the container for the classification model; and converting the random set of documents to test documents for assessing accuracy of auto-classification by the classification model.

11. The computer program product of claim 8, wherein the instructions are further translatable by the server machine running the auto-classification system for:

responsive to a command to delete or remove an exemplar from a classification in the classification model, determining whether the exemplar is last exemplar for the classification in the classification model; and responsive to the exemplar being the last exemplar for the classification in the classification model, displaying a warning message that the classification is to be deleted or removed from the classification model along with the exemplar.

12. The computer program product of claim 8, wherein the user interface of the auto-classification system comprises a review function through which classifications automatically assigned by the auto-classification system to the plurality of documents residing on the content source or the data source are reviewed, accepted, rejected, or corrected.

13. The computer program product of claim 8, wherein the instructions are further translatable by the server machine running the auto-classification system for:

automatically performing the activating.

14. The computer program product of claim 8, wherein the instructions are further translatable by the server machine running, the auto-classification system for:

performing the activating responsive to user input on a user-selectable interface element of the user interface.

15. An auto-classification system for auto-classification of digital content, the auto-classification system comprising:

a processor;

a non-transitory computer-readable medium; and stored instructions translatable by the processor for:

receiving, over a network through a user interface of the auto-classification system on the user device, an indication from a user to create or modify a classification model;

responsive to the indication, generating or accessing a container for the classification model;

providing a list of classification trees to the user device over the network for display on the user device, the list of classification trees residing on a content source communicatively connected to the auto-classification system;

receiving, through the user interface on the user device, a selection of a specific classification or a classification tree from the list of classification trees displayed on the user device, the classification tree comprising individual classifications;

importing one or more content source documents that have been assigned with the specific classification or the classification tree from the content source into the container for the classification model;

determining a plurality of documents to be automatically classified, the plurality of documents residing on the content source or a data source communicatively connected to the auto-classification system;

automatically classifying the plurality of documents residing on the content source or the data source utilizing the one or more content source documents in the container for the classification model, the automatically classifying comprising:

comparing characteristics of the one or more content source documents in the container for the classification model and characteristics of a document of the plurality of documents residing on the content source or the data source; and automatically assigning the document to the specific classification or the individual classifications of the classification tree of the one or more content source documents in the container for the classification model responsive to the characteristics of the document sufficiently matching the characteristics of the one or more content source documents in the container for the classification model;

activating a dynamic user feedback guide in the user interface;

determining at least one recommended action, suggestion, tip, or piece of information for refining the classification model; and displaying the at least one recommended action suggestion, tip, or piece of information in the dynamic user feedback guide of the user interface on the user device.

16. The auto-classification system of claim 15, wherein the content source comprises at least one of a content server, a content repository, a content management system, or a file system.

17. The auto-classification system of claim 15, wherein the instructions are further translatable by the processor for:

automatically selecting a random set of documents from content source documents being imported into the container for the classification model; and converting the random set of documents to test documents for assessing accuracy of auto-classification by the classification model.

18. The auto-classification system of claim 15, wherein the instructions are further translatable by the processor for:

responsive to a command to delete or remove en exemplar from a classification in the classification model, determining whether the exemplar is last exemplar for the classification in the classification model; and responsive to the exemplar being the last exemplar for the classification in the classification model, displaying a warning message that the classification is to be deleted or removed from the classification model along with the exemplar.

19. The auto-classification system of claim 15, wherein the user interface of the auto-classification system comprises a review function through which classifications automatically assigned by the auto-classification system to the plurality of documents residing on the content source or the data source are reviewed, accepted, rejected, or corrected.

20. The auto-classification system of claim 15, wherein the instructions are further translatable by the processor for:

automatically, performing the activating.

21. The auto-classification system of claim 15, wherein the instructions are further translatable by the processor for:

performing the activating responsive to user input on a user-selectable interface element of the user interface.

\* \* \* \* \*